US012763954B2

(12) United States Patent
Maddukuri et al.

(10) Patent No.: US 12,763,954 B2
(45) Date of Patent: Oct. 13, 2026

(54) DECENTRALIZED IDENTIFICATION WITH THIRD-PARTY ISSUED IDENTIFICATION

(71) Applicant: American Express Travel Related Services Company, Inc., New York, NY (US)

(72) Inventors: Ajay Babu Maddukuri, Phoenix, AZ (US); Mukund Shankar SimhaRaghu, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 98 days.

(21) Appl. No.: 18/457,105

(22) Filed: Aug. 28, 2023

(65) Prior Publication Data

US 2025/0080350 A1 Mar. 6, 2025

(51) Int. Cl.
*H04L 9/32* (2006.01)

(52) U.S. Cl.
CPC .......... *H04L 9/3213* (2013.01); *H04L 9/3247* (2013.01)

(58) Field of Classification Search
CPC .. H04L 9/3213; H04L 9/3247; H04L 63/0853
See application file for complete search history.

(56) References Cited

U.S. PATENT DOCUMENTS

| | | | | |
|---|---|---|---|---|
| 10,630,648 | B1 * | 4/2020 | Borunda | H04L 9/3213 |
| 11,272,100 | B2 * | 3/2022 | Mallet | H04N 7/188 |
| 11,507,943 | B1 * | 11/2022 | Ashley | G06Q 20/36 |
| 11,556,959 | B2 * | 1/2023 | Fournier | H04L 9/3247 |
| 2015/0074774 | A1 * | 3/2015 | Nema | H04L 63/062 726/5 |
| 2017/0201515 | A1 * | 7/2017 | Clark | G06Q 20/36 |
| 2019/0182042 | A1 * | 6/2019 | Ebrahimi | H04L 9/3234 |
| 2019/0295077 | A1 * | 9/2019 | Mardikar | G06Q 20/401 |
| 2020/0211099 | A1 * | 7/2020 | Smith | H04L 63/126 |
| 2021/0192519 | A1 * | 6/2021 | Mchugh | G06Q 20/38215 |
| 2022/0245652 | A1 * | 8/2022 | Nonni | G06Q 20/401 |
| 2023/0075539 | A1 * | 3/2023 | Pohjola | G06F 21/45 |
| 2023/0164143 | A1 * | 5/2023 | Richardson, IV | H04L 63/0876 726/6 |
| 2023/0177495 | A1 * | 6/2023 | Duffy | G06Q 20/3674 705/76 |
| 2023/0259922 | A1 * | 8/2023 | Rao | H04L 9/3213 |
| 2023/0306547 | A1 * | 9/2023 | Patel | G06Q 50/265 |
| 2024/0314562 | A1 * | 9/2024 | Suzuki | G06F 21/33 |

* cited by examiner

*Primary Examiner* — Mohammad A Siddiqi
(74) *Attorney, Agent, or Firm* — Thomas | Horstemeyer, LLP

(57) ABSTRACT

Disclosed are various embodiments for providing verifiable credentials representing a driver's license or other form of identification issued by a government or a third-party. A wallet application can request a third-party issued identification of a user from a third-party application installed on the computing device. The wallet application can then receive the third-party issued identification from the third-party application. Subsequently, the wallet application can verify the third-party issued identification and then establish a secure communications channel with an issuer service. The wallet application can then request a verifiable credential that represents the third-party issued identification.

20 Claims, 3 Drawing Sheets

DECENTRALIZED IDENTIFICATION WITH THIRD-PARTY ISSUED IDENTIFICATION

BACKGROUND

Decentralized Identifiers (DIDs) are globally unique identifiers that enable individuals, organizations, or devices (holders) to have verifiable and self-owned digital identities. Verifiable credentials (VCs) are data structures generated by issuers that represent claims about some attribute, qualification, or achievement of a holder. A holder can generate a verifiable presentation (VP) from VCs that can be presented to a verifier for easy verification of the authenticity and origin of the claim.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing verifiable credentials representing a driver's license or other form of identification issued by a government or a third-party. The verifiable credential could be associated with a decentralized identifier (DID) that identifies a user. This allows for a user to assert or prove their identity to others using a DID and an associated verifiable credential in situations where a government or other third-party provided form of identification is required.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

Figure 1:
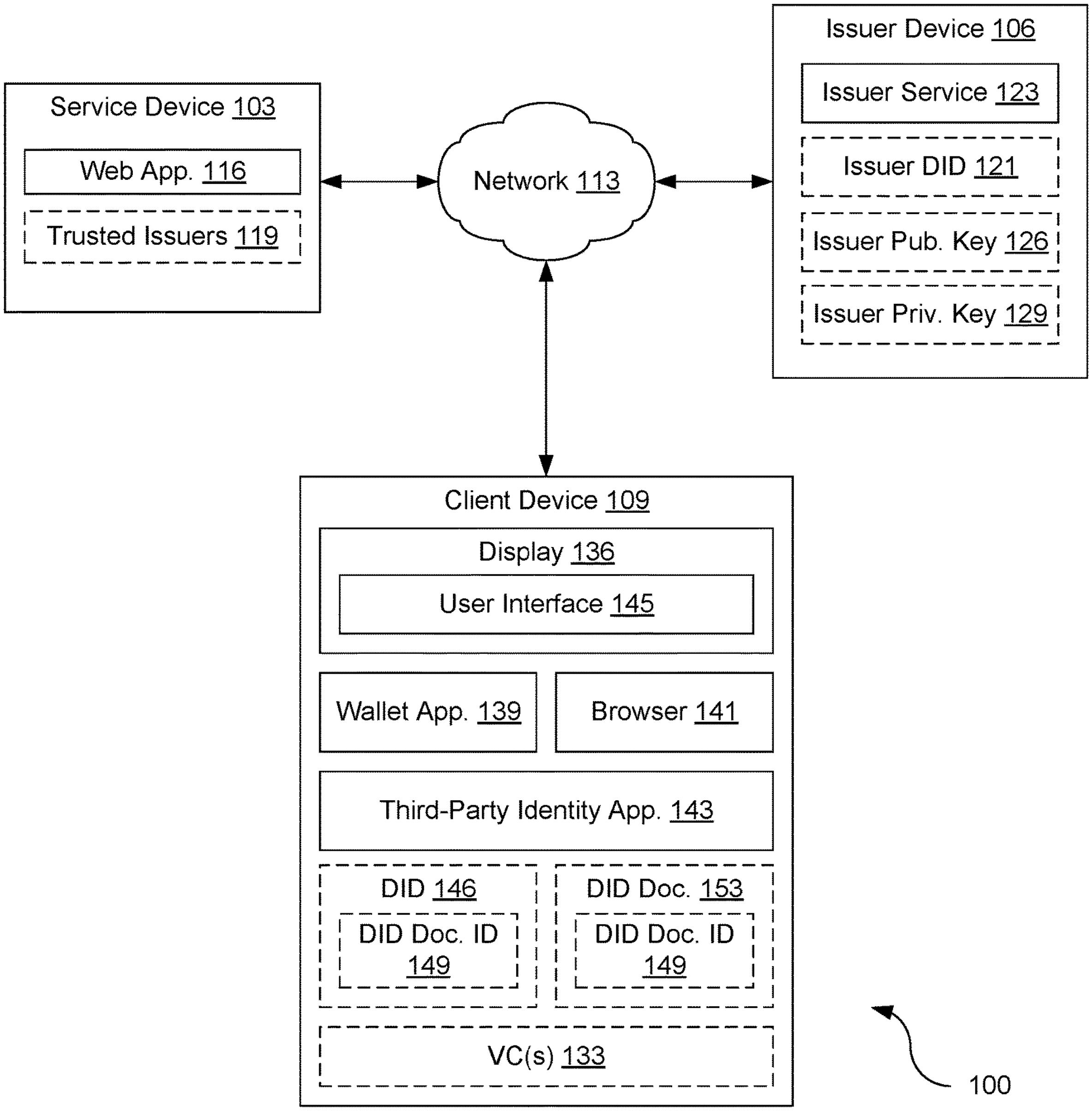
FIG. 1 is a drawing of a network environment according to various embodiments of the present disclosure.

FIG. 1 depicts a network environment 100 according to various embodiments. The network environment 100 can include one or more computing devices that include a processor, a memory, and/or a network interface. These computing devices can include a service device 103, an issuer device 106, one or more client devices 109, and potentially other computing devices.

One or more of these computing devices could be located within a computing environment. Such a computing environment could employ a plurality of computing devices that can be arranged in one or more server banks or computer banks or other arrangements. Such computing devices can be located in a single installation or can be distributed among many different geographical locations. For example, the computing environment can include a plurality of computing devices that together can include a hosted computing resource, a grid computing resource or any other distributed computing arrangement. In some cases, the computing environment can correspond to an elastic computing resource where the allotted capacity of processing, network, storage, or other computing-related resources can vary over time.

These computing devices can be in data communication with each other via a network 113. The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

A service device 103 can represent one or more computing devices that host web sites, web pages, and/or web applications. Accordingly, a service device 103 could be configured to host or provide a web application 116, as well any ancillary services or programs required to host or provide the web application 116, such as web servers or services, database servers or services, etc. A service device 103 could also store a list of one or more trusted issuers 119, according to various embodiments of the present disclosure.

A web application 116 can include any software application accessible using a web browser or similar software. A web application could include, for example, a set of web pages that, when accessed by a user, allow a user to view or submit different types of data or perform different actions or operations. Some of the web pages provided by the web application to the browser on the user's device could include embedded scripts that could be executed to provide enriched client-side functionality and/or communicate with the web application on the service device 103 asynchronously.

The trusted issuers 119 can represent a list of one or more issuer devices 106 or issuer services 123 that are trusted by the web application 116. For example, a service device 103 or web application 116 could be configured to only trust verifiable credentials 133 issued by particular issuers who are known to be trustworthy. For example, a trusted issuer of verifiable credentials 133 might be trusted to determine the veracity of any information included in a verifiable credential 133 that it issues. Therefore, the service device 103 or web application 116 could be configured to only or preferentially rely on verifiable credentials issued by issuer devices 106 or issuer services 123 listed in the trusted issuers 119.

Issuer devices 106 or issuer services 123 could be identified among the trusted issuers 119 in a variety of manners. For example, the issuer public key 126, or a fingerprint of the issuer public key 126, associated with an issuer service 123 or issuer device 106 could be used as an identifier for a trusted issuer 119. As another example, a unique identifier for the operator of the issuer device 106 or issuer service 123 could be used as an identifier for a trusted issuer 119. An example of such a unique identifier would be an issuer decentralized identifier (DID) 121 or a fingerprint of an issuer public key 126. The issuer DID 121 can be implemented using various standards, such as a version of the World Wide Web Consortium's (W3C's) Decentralized Identifier (DID) standard.

An issuer device 106 can represent one or more computing devices that are used to issue verifiable credentials 133. An issuer device 106 could be configured to host or execute an issuer service 123. An issuer device 106 could also store or have access to an issuer public key 126 and/or an issuer private key 129. The issuer device 106 and/or issuer service 123 could be operated by a variety of entities, including government agencies and corporate entities. For example, government agencies that are responsible for issuing government identification documents (e.g., driver's licenses, passports, etc.) could operate issuer devices 106 and/or issuer services 123 in order to issue verifiable credentials 133 to individuals. As another example, corporations that have extensive, verified knowledge about the identity of customers or individuals (e.g., data brokers, identity brokers, financial institutions, etc.) could operate issuer devices 106 and/or issuer services 123 in order to issue verifiable credentials 133 to individuals.

The issuer service 123 could be executed to respond to requests to issue verifiable credentials 133. For example, an issuer service 123 could receive a request to issue a verifiable credential from a client device 109. The request could include a specific decentralized identifier (DID) 146 for the verifiable credential 133 to be associated with and/or information identifying the user or individual associated with the DID 146. The issuer service 123 could then issue a verifiable credential 133 in response, which could be signed by the issuer private key 129 to allow third parties to determine the authenticity of the verifiable credential 133.

The issuer public key 126 and the issuer private key 129 could be parts of a public-private or asymmetric cryptographic key-pair used by the issuer service 123 when issuing verifiable credentials 133. The issuer private key 129 could be used to sign any verifiable credentials 133 issued, allowing third parties to determine the authenticity of the verifiable credential 133. The issuer public key 126 could be provided to any third party that requested the issuer public key 126 in order to verify that a verifiable credential 133 signed by the issuer private key 129 is genuine. The issuer public key 126, or a fingerprint of the issuer public key 126 could also be used to uniquely identify an issuer device 106 or issuer service 123 with respect to other issuer devices 106 or issuer services 123.

A client device 109 is representative of one or more client devices 109 that can be coupled to the network 113. A client device 109 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. A client device 109 can include one or more displays 136, such as liquid crystal displays (LCDs), gas plasma-based flat panel displays, organic light emitting diode (OLED) displays, electrophoretic ink ("E-ink") displays, projectors, or other types of display devices. In some instances, the display 136 can be a component of a client device 109 or can be connected to a client device 109 through a wired or wireless connection.

A client device 109 can be configured to execute various applications such as a wallet application 139, a browser 141 (e.g., a web browser such as GOOGLE CHROME®, MICROSOFT EDGE®, APPLE SAFARI®, MOZILLA FIREFOX®, etc.), a third-party identity application 143, and/or other applications. The wallet application 139 and/or the third-party identity application 143, when executed, can cause a user interface 145 to be shown on the display 136.

The wallet application 139 can represent any application that allows a user to manage his or her digital identity, including generating or issuing DIDs 146; creating and/or storing DID Documents 149; requesting, obtaining, or sharing verifiable credentials 133; revoking or invalidating DIDs 146 or verifiable credentials 133; etc. The wallet application 139 could be a separate, standalone application or, in some implementations, could be an extension or plugin that is run by a browser.

The third-party identity application 143 can represent any third-party applications that are also installed on and executable by the client device 109 for the purposes of providing or maintaining identification credentials for a user of the client device 109. One example of a third-party identity application 143 is a mobile driver's license application, which could allow for driver's license information to be stored on the client device 109 for the purpose of identifying the user. In this example, a user's driver's license number, issuing state, and other information typically listed on a driver's license (e.g., full legal name, residential or mailing address, height, weight, eye color, birthdate, photo, signature, etc.) could be stored on the client device 109 by the third-party identity application 143.

A decentralized identifier (DID) 146 can correspond to an identifier that enables a verifiable, decentralized digital identity for a subject (e.g., a person, organization, thing, etc.). For example, a DID 146 can be used to represent the identity of a user, a computing device, or other objects. An individual can have multiple DIDs 146. For example, a user might use a first decentralized identifier 146 to manage their work-related identity and a second decentralized identifier 146 to manage their personal identity outside of work. In some instances, a DID 146 could be created and stored on a publicly accessible distributed ledger (e.g., a blockchain network) or a DID 146 could be created and stored on the client device 109 for sharing directly with peer devices or peer services, in which case the DID 146 can be referred to as a peer DID 146. Each DID 146 can include one or more DID document identifiers 149. A DID document identifier 149 can include any identifier that uniquely identifies a DID document 153 with respect to another DID document 153. In some implementations, the DID 146 can be implemented using various standards, such as a version of the World Wide Web Consortium's (W3C's) Decentralized Identifier (DID) standard.

A DID document 153 is a document which describes how to interact with the owner of the DID 146. For example, the DID document 153 can describe the mechanisms by which a subject of a DID 146 can authenticate itself or prove its association with the DID 146. This can include identifying the cryptographic public keys corresponding to the cryptographic private keys held by the subject of a DID 146. In some implementations, the DID document 153 can be implemented using various standards, such as a version of the W3C's Decentralized Identifier (DID) standard.

A verifiable credential 133 represents a credential issued by an issuer service 123 to the wallet application 139 of the user, which can store the verifiable credential 133 on the client device 109. Verifiable credentials 133 can be represented, for example, using JavaScript Object Notation (JSON) objects or files. A verifiable credential 133 can include various fields or data, such as the issuer of the verifiable credential 133, the subject of the verifiable credential 133, the type of credential, etc. Fields such as those representing the issuer or subject of the verifiable credential 133 could have a respective DID 146 specified as the identifier of the issuer or subject. For example, a first DID 146 could be included in the verifiable credential 133 to identify the user of the client device 109 and a second DID 146 could be included in the verifiable credential 133 that identifies the issuer device 106 or issuer service 123 that issued the verifiable credential 133. In some implementations, verifiable credentials 133 could be implemented using a standard, such as a version of the W3C's "Verifiable Credentials Data Model."

It should be noted that although the DIDs 146 and DID documents 153 illustrated are stored locally on client devices 109, DIDs 146 and/or DID documents 153 could be stored in publicly available databases or ledgers, such as decentralized distributed ledgers (e.g., public blockchains such as ETHEREUM®). However, DIDs 146 and DID documents 153 can be stored locally on client devices 109 to allow for additional privacy for the user.

Figure 2:
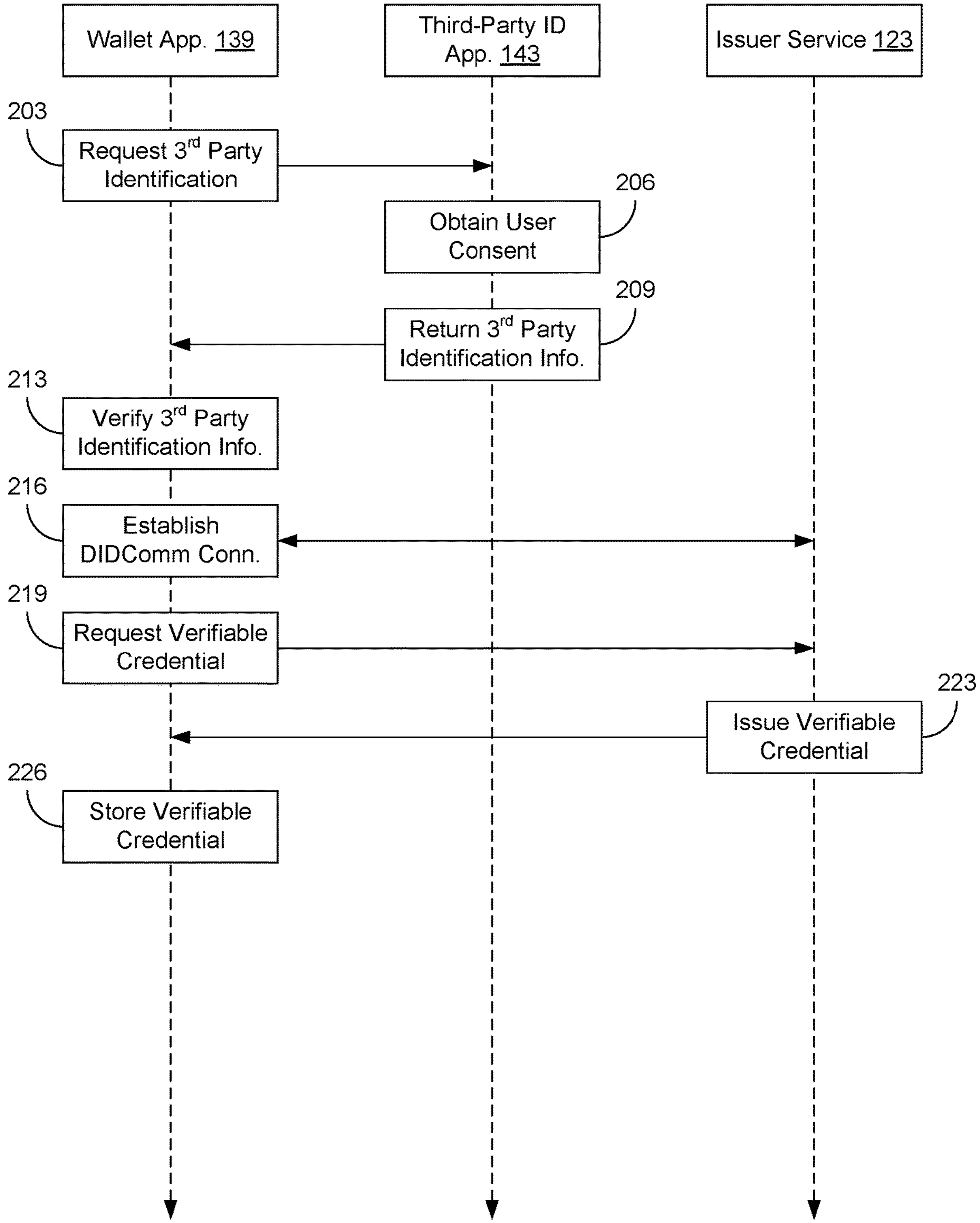
FIG. 2 is a sequence diagram illustrating one example of the interactions between the different components of the network environment of FIG. 1 according to various embodiments of the present disclosure.

Referring next to FIG. 2, shown is a sequence diagram that provides one example of the interactions between the wallet application 139, the third-party identity application 143 and the issuer service 123. The sequence diagram of FIG. 2 provides merely an example of the many different types of functional arrangements that can be employed to implement the operation of the depicted portions of the wallet application 139, the third-party identity application 143 and the issuer service 123. As an alternative, the sequence diagram of FIG. 2 can be viewed as depicting an example of elements of a method implemented within the network environment 100.

Beginning with block 203, the wallet application 139 can send a request to the third-party identity application 143 for third-party identification information. For example, if the third-party identity application 143 were a mobile driver's license application, the wallet application 139 could request information related to the mobile driver's license of the user stored on the client device 109. The wallet application 139 could establish a secure connection with the third-party identity application 143 in order to maintain confidentiality.

Next, at block 206, the third-party identity application 143 can obtain consent from the user of the client device 109 to share the third-party identification information (e.g., to share the mobile driver's license of the user). For example, the third-party identity application 143 could cause a user interface 145 to be shown on the display 136. The user interface 145 could include a prompt asking for the consent of the user. The identity of the wallet application 139 and the information requested could also be presented in order to allow the user to make an informed decision regarding whether to share the requested third-party identification information (e.g., a mobile driver's license).

Then, provided that consent is received from the user at block 206, the third-party identity application 143 can return the requested third-party identification information at block 209. For example, if the wallet application 139 requested all information associated with a third-party identification (e.g., all the information encompassed by a mobile driver's license), then the third-party identity application 143 can return all information associated with the third-party identification. Similarly, if the wallet application 139 requested only a portion of the information associated with the third-party identification (e.g., select fields from a mobile driver's license), then the third-party identity application 143 can return the requested or selected information. The information provided by the third-party identity application 143 can also be cryptographically signed by the third-party identity application 143 using a private key of the third-party identity application 143.

Moving on to block 213, the wallet application 139 can cryptographically verify the integrity and/or authenticity of the identification information provided by the third-party identity application 143. For example, the wallet application 139 could use a public key associated with the private key of the third-party identity application 143 to verify the signature created by the third-party identity application 143 using the private key of the third-party identity application 143. If the signature is correct, then the wallet application 139 can determine that the identification information was provided by the third-party identity application 143 and also that the identification information has not been tampered with.

Proceeding to block 216, the wallet application 139 and the issuer service 123 can establish a DIDcomm connection. As part of the connection process, the wallet application 139 could request or obtain the consent of the user to establish the DIDcomm connection with the issuer service 123 prior to establishing the connection. The DIDcomm connection can be accomplished or established according to the specification of any version of the DIDcomm protocol as published by the Decentralized Identity Foundation (DIF).

Next, at block 219, the wallet application 139 can use the DIDcomm connection established at block 216 to request a verifiable credential 133 from the issuer service 123. The request can include the identification information received from the third-party identity application 143 at block 213 (e.g., mobile driver's license data). In some implementations, the request could also include additional information about the user stored by or otherwise available to the wallet application 139 (e.g., information associated with other verifiable credentials 133 previously issued to the user). For example, if the wallet application 139 had a verifiable credential 133 issued by a utility company stored on the client device 109, the wallet application 139 could include information associated with the verifiable credential 133 issued by the utility company. As another example, if the wallet application 139 had a verifiable credential 133 issued by a bank or other financial institution stored on the client device 109, the wallet application 139 could include information associated with the verifiable credential 133 issued by the bank or other financial institution.

Subsequently, at block 223, the issuer service 123 can create and issue a verifiable credential 133 for the user and provide the verifiable credential 133 to the wallet application 139. The verifiable credential 133 could be created to comply with a form or format specified by a version of the W3C's "Verifiable Credentials Data Model." As part of the issuance process, the issuer service 123 could sign the verifiable credential 133 with the issuer private key 129 in order to allow third parties to confirm that the verifiable credential 133 was issued by the issuer service 123. The verifiable credential 133 could also include the issuer DID 121 associated with the issuer service 123, which could allow others to identify or otherwise determine which issuer service 123 issued an individual verifiable credential 133.

The verifiable credential 133 could also include the DID 146 of the individual or entity identified by the verifiable credential 133.

Moreover, the verifiable credential 133 could include the information provided in the request from the wallet application 139 at block 219. For example, the verifiable credential 133 could include the identification information received from the third-party identity application 143 at block 213 (e.g., mobile driver's license data). If additional information were provided by the wallet application 139, this information could also be included in the verifiable credential 133 (e.g., a pointer or identifier to a verifiable credential 133 issued by a utility company, bank or financial institution, etc.; information from a verifiable credential 133 issued by a utility company, bank or financial institution, etc.; or any other additional identifying information provided by the wallet application 139). In some implementations, the verifiable credential 133 could contain identifying information from multiple sources to facilitate identification of the user to third-parties that required multiple forms of identification.

Then, at block 226, the wallet application 139 can store the verifiable credential 133 issued by the issuer service 123 on the client device 109. The wallet application 139 can, in some implementations, store the verifiable credential 133 in a secure storage area (e.g., provided by a secure enclave of the client device) or in an encrypted form in order to prevent unauthorized use of the verifiable credential 133.

Figure 3:
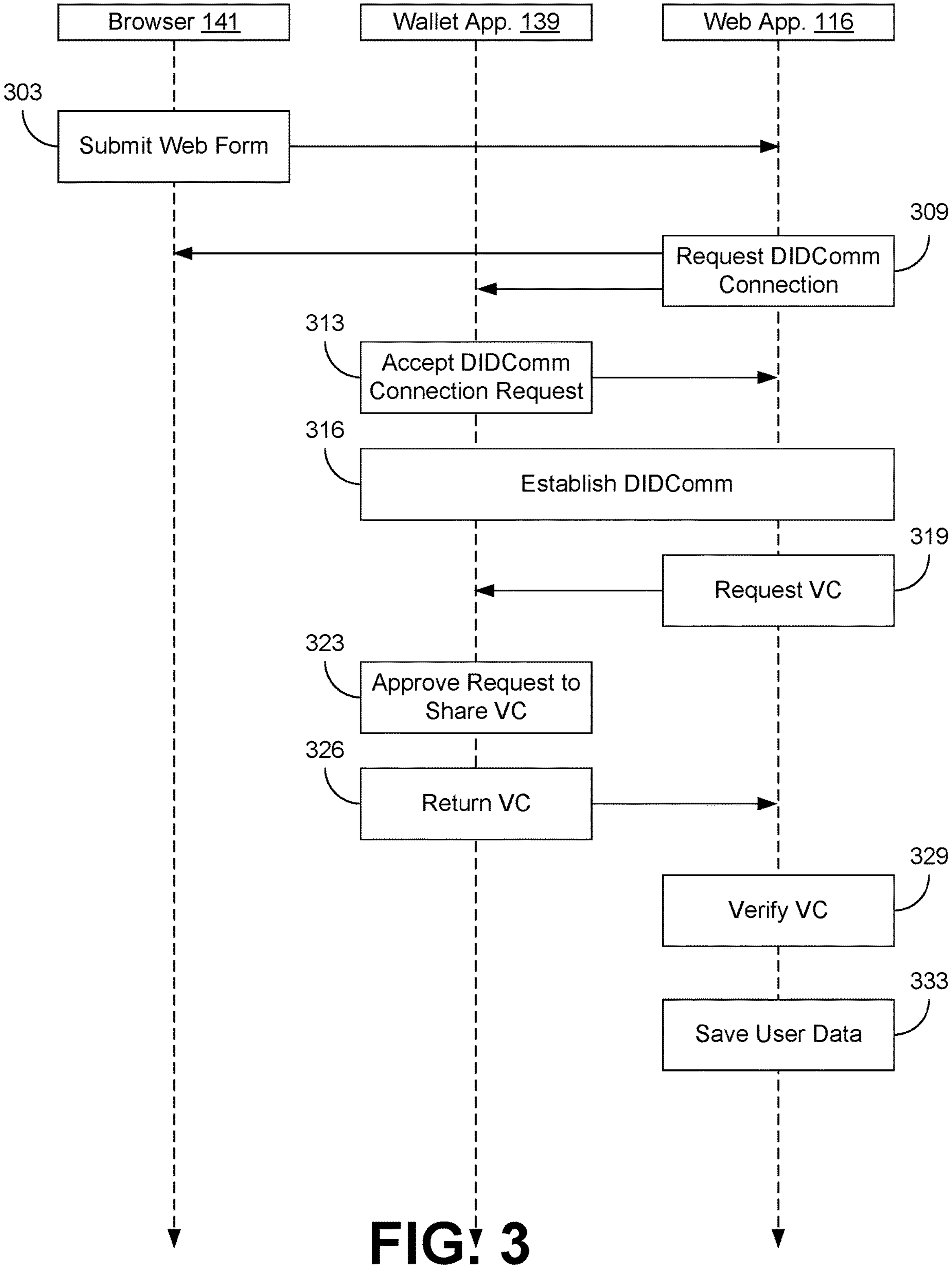
FIG. 3 is a sequence diagram illustrating one example of the interactions between the different components of the network environment of FIG. 1 according to various embodiments of the present disclosure.

Referring next to FIG. 3, shown is a sequence diagram that provides one example of the interactions between the browser 141, wallet application 139, and web application 116. The sequence diagram of FIG. 3 provides merely an example of the many different types of interactions between the browser 141, wallet application 139, and web application 116. As an alternative, the sequence diagram of FIG. 3 can be viewed as depicting an example of elements of a method implemented within the network environment 100.

Beginning with block 303, the browser 141 can submit a web form or request a web application 116 to instruct the web application 116 to use a verifiable credential 133 to verify the identity of the user. For example, as part of an application process, a web application 116 could send a web form or web request to the browser 141 asking for the user to provide one or more forms of identification (e.g., government issued identification, commercially identifying information such as utility invoices, bank account information, etc.). In some instances, the web form or web page could include an option to use one or more verifiable credentials 133. In response, the browser 141 could submit the web form or web page to instruct the web application 116 to use a verifiable credential 133 to verify the identity of the user.

Next, at block 309, the web application 116 can make a request to establish a DIDcomm connection with the wallet application 139 of the user. For example, the web application 116 could send a matrix bar code (e.g., a quick response (QR) code) to the browser 141, which the browser 141 could show on a display of a client device 109. As another example, the issuer service 123 could send a connection message or request to the browser 141, which could then relay or pass on the message to a wallet application 139 executed by the client device 109. In response, the wallet application 139 could display a prompt, or cause the browser 141 to display a prompt to obtain the approval of the user to establish the connection between the wallet application 139 and the issuer service 123.

Accordingly, at block 313, the user could use his or her wallet application 139 to accept the DIDcomm connection request. For example, the user could use his or her wallet application on a second client device 109 to scan the matrix bar code shown on the display of the client device 109 that is executing the browser 141 in order to accept the DIDComm request. As another example, the user could approve the connection request using a prompt shown by the wallet application 139 or the browser 141. Other approaches for accepting or approving a DIDcomm connection between the issuer service 123 and the wallet application 139 according to various embodiments of the present disclosure.

Proceeding to block 316, the wallet application 139 and the web application 116 can establish a DIDcomm connection in response to the user approving or consenting to the connection using the wallet application 139 at block 313. This can be accomplished according to the specification of any version of the DIDcomm protocol as published by the Decentralized Identity Foundation (DIF).

Moving on to block 319, the web application 116 can request a verifiable credential 133 from the wallet application 139. This could be done using one or more of several approaches. In a first approach, the web application 116 could send a request for a verifiable credential 133 via the DIDcomm connection. This request could cause the wallet application 139 to prompt the user to select a verifiable credential 133 from one or more verifiable credentials 133 stored on the client device 109 of the user. In a second approach, the web application 116 could request a specific verifiable credential 133. This could be done, for example, by identifying the issuing entity of a specific verifiable credential 133. For instance, if the web application 116 and the issuer service 123 were operated by the same entity, the web application 116 could provide the issuer DID 121 of the issuer service 123 or issuer public key 126 of the issuer service 123 to the wallet application 139 as a mechanism for selecting a verifiable credential 133 that had been previously issued by the operator of the web application 116. This would allow the wallet application 139 to select a verifiable credential 133 issued by the issuer service 123 identified by the issuer DID 121 or issuer public key 126. In a similar example, the web application 116 could provide the set of issuer DIDs 121 or set of issuer public keys 126 included in the list of trusted issuers 119. This would act as a request for any verifiable credential 133 that had been issued by an issuer service 123 that was trusted by the web application 116.

Then, at block 323, the wallet application 139 could approve the request to share a verifiable credential 133 with the web application. For example, the user could select within the wallet application 139 a specific verifiable credential 133 that the user wished to share with the web application 116. As another example, the user could review one or more verifiable credentials 133 identified by the web application 116 and select which verifiable credential(s) 133 to share with the web application 116. Moreover, the user could select which questions are to be used for authentication and/or which answers he or she is willing to share with the web application 116.

Next, at block 326, the wallet application 139 can return the verifiable credential(s) 133 selected and approved by the user. The verifiable credential(s) 133 could be returned using the same DIDcomm connection that was established at block 316.

Accordingly, at block 329, the web application 116 can verify the verifiable credential 133 received at block 326. For example, the web application 116 can determine whether the issuer DID 121 associated with the issuer service 123 of the verifiable credential 133 is among the trusted issuers 119 for the web application 116. As another example, the web application 116 could determine whether the signature for the verifiable credential 133 is valid, indicating that the verifiable credential 133 was issued by the issuer service 123 and that the verifiable credential 133 has not been altered or otherwise tampered with.

After the verifiable credential 133 has been verified, the web application 116 can, at block 333, save any user data associated with the verifiable credential 133. For example, the web application 116 could save the decentralized identifier (DID) 146 associated with the user of the client device 109 or verifiable credential 133 as proof that the identity of the user has been verified. As another example, the web application 116 could save a copy of the verifiable credential 133 as proof of the identity of the user. In other examples, information specified in the claims of the verifiable credential 133 could be saved by the web application 116, such as third-party identifying information for the user (e.g., information specified by a user's mobile driver's license).

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase “at least one of X, Y, or Z,” unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and a wallet application comprising machine-readable instructions stored in the memory that, when executed by the processor, cause the computing device to at least:

request a third-party issued identification of a user from a third-party application installed on the computing device, wherein the third-party application is a mobile driver’s license (MDL) application and the third-party issued identification is a mobile driver’s license issued to the user;

receive the third-party issued identification from the third-party application, wherein the third-party issued identification is cryptographically signed by the third-party application using a third-party private key;

verify the third-party issued identification using a third-party public key corresponding to the third-party private key;

establish a secure communications channel with an issuer service; and request, through the secure communications channel, from an issuer service, a verifiable credential, wherein the request includes a decentralized identifier (DID) that represents the user and information obtained from the third-party issued identification, and wherein the verifiable credential represents the third-party issued identification.

2. The system of claim 1, wherein the machine-readable instructions further cause the computing device to at least:

receive the verifiable credential from the issuer service; and store the verifiable credential.

3. The system of claim 2, wherein the verifiable credential is stored in an encrypted form.

4. The system of claim 1, wherein the request further includes user data available to the wallet application and the verifiable credential further represents the user data available to the wallet application.

5. The system of claim 1, wherein the machine-readable instructions that cause the computing device to verify the third-party issued identification further cause the computing device to at least verify a signature of the third-party issued identification.

6. The system of claim 1, wherein the secure communications channel complies with a version of the decentralized identifier communications (DIDcomm) protocol.

7. The system of claim 1, wherein the machine-readable instructions further cause the computing device to at least provide the verifiable credential to a web application in response to a request for the verifiable credential.

8. A method, comprising:

requesting a third-party issued identification of a user from a third-party application installed on a computing device, wherein the third-party application is a mobile driver’s license (MDL) application and the third-party issued identification is a mobile driver’s license issued to the user;

receiving the third-party issued identification from the third-party application, wherein the third-party issued identification is cryptographically signed by the third-party application using a third-party private key;

verifying the third-party issued identification using a third-party public key corresponding to the third-party private key;

establishing a secure communications channel with an issuer service; and requesting, through the secure communications channel, from an issuer service, a verifiable credential, wherein the request includes a decentralized identifier (DID) that represents the user and information obtained from the third-party issued identification, and wherein the verifiable credential represents the third-party issued identification.

9. The method of claim 8, further comprising:

receiving the verifiable credential from the issuer service; and storing the verifiable credential.

10. The method of claim 9, wherein the verifiable credential is stored in an encrypted form.

11. The method of claim 8, wherein the request further includes user data available to a wallet application and the verifiable credential further represents the user data available to the wallet application.

12. The method of claim 8, wherein verifying the third-party issued identification further comprises verifying a signature of the third-party issued identification.

13. The method of claim 8, wherein the secure communications channel complies with a version of the decentralized identifier communications (DIDcomm) protocol.

14. The method of claim 8, further comprising providing the verifiable credential to a web application in response to a request for the verifiable credential.

15. A non-transitory, computer-readable medium, comprising machine-readable instructions for a wallet application that, when executed by a processor of a computing device, cause the computing device to at least:

request a third-party issued identification of a user from a third-party application installed on the computing device, wherein the third-party application is a mobile driver's license (MDL) application and the third-party issued identification is a mobile driver's license issued to the user;

receive the third-party issued identification from the third-party application, wherein the third-party issued identification is cryptographically signed by the third-party application using a third-party private key;

verify the third-party issued identification using a third-party public key corresponding to the third party-private key;

establish a secure communications channel with an issuer service; and request, through the secure communications channel, from an issuer service, a verifiable credential, wherein the request includes a decentralized identifier (DID) that represents the user and information obtained from the third-party issued identification, and wherein the verifiable credential represents the third-party issued identification.

16. The non-transitory, computer-readable medium of claim 15, wherein the machine-readable instructions further cause the computing device to at least:

receive the verifiable credential from the issuer service; and store the verifiable credential.

17. The non-transitory, computer-readable medium of claim 16, wherein the verifiable credential is stored in an encrypted form.

18. The non-transitory, computer-readable medium of claim 15, wherein the request further includes user data available to the wallet application and the verifiable credential further represents the user data available to the wallet application.

19. The non-transitory, computer-readable medium of claim 15, wherein the machine-readable instructions that cause the computing device to verify the third-party issued identification further cause the computing device to at least verify a signature of the third-party issued identification.

20. The non-transitory, computer-readable medium of claim 15, wherein the secure communications channel complies with a version of the decentralized identifier communications (DIDcomm) protocol.

* * * * *